United States Patent [19]
Yamada et al.

[11] Patent Number: 5,230,081
[45] Date of Patent: Jul. 20, 1993

[54] METHOD AND APPARATUS FOR LOCATING WHICH ZONE AND SECTOR OF A MOBILE COMMUNICATION SYSTEM A MOBILE STATION IS IN

[75] Inventors: Tomoyuki Yamada; Seizo Onoe; Narumi Umeda; Takanori Utano, all of Yokohama, Japan

[73] Assignee: Nippon Telegraph and Telephone Corporation, Tokyo, Japan

[21] Appl. No.: 689,834

[22] PCT Filed: Sep. 18, 1990

[86] PCT No.: PCT/JP90/01190
§ 371 Date: Jun. 26, 1991
§ 102(e) Date: Jun. 26, 1991

[87] PCT Pub. No.: WO91/04616
PCT Pub. Date: Apr. 4, 1991

[30] Foreign Application Priority Data
Sep. 19, 1989 [JP] Japan .................... 1-242468

[51] Int. Cl.$^5$ ............................. H04B 7/26
[52] U.S. Cl. .................. 455/33.1; 455/54.1; 455/56.1; 379/59
[58] Field of Search ............. 455/33.1-33.4, 455/54.1, 54.2, 56.1, 67.1, 226.1, 226.2, 226.3, 34.1; 379/59, 60, 63

[56] References Cited

U.S. PATENT DOCUMENTS
4,797,947 1/1989 Labedz ..................... 455/33.3

FOREIGN PATENT DOCUMENTS
58-187033 11/1983 Japan .
59-161139 9/1984 Japan .
60-69923 4/1985 Japan .

Primary Examiner—Reinhard J. Eisenzopf
Assistant Examiner—Chi H. Pham
Attorney, Agent, or Firm—Cushman, Darby & Cushman

[57] ABSTRACT

A location method and system for a mobile communication system having a plurality of zones and a plurality of sectors in each zone. The location method and system locate a zone and sector in a zone where a mobile station is located. In the location system a base station associated with each zone transmits a control channel signal and transmits a sector signal for each sector in the zone. Each control signal of a zone differs from control channel signals of other zones. Each sector signal differs from other sector signal and control channel signals. A mobile station controller associated with each mobile station receives the control channel signals, determines which zone the mobile station is in as a location zone based on the received control channel signals, receives sector signals for sectors within the location zone, and determines which sector of the location zone the mobile station is in as a location sector based on the received sector signals.

18 Claims, 12 Drawing Sheets

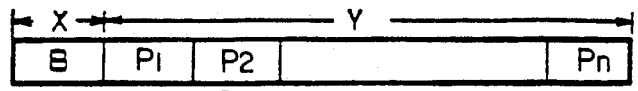
FIG. 4a frame format
FIG. 4b blank times
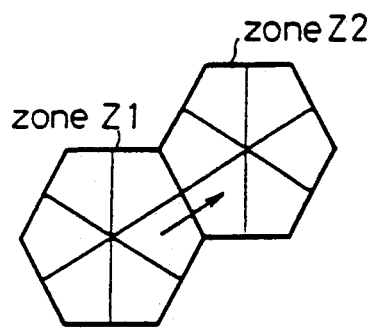
FIG. 5
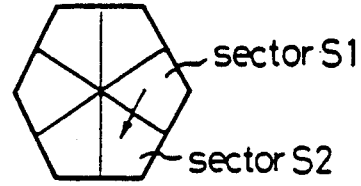
FIG. 6
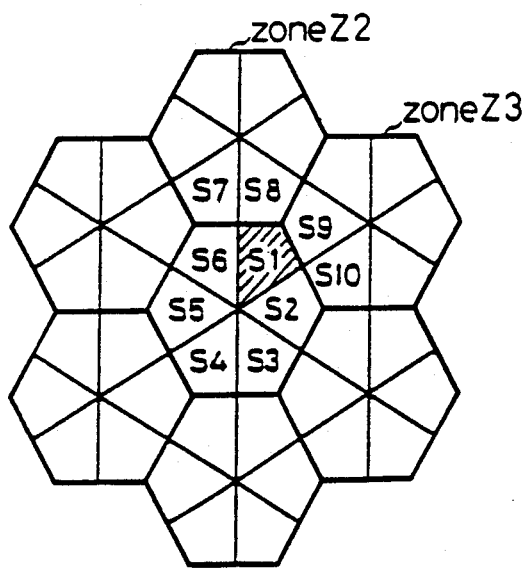
FIG. 7a
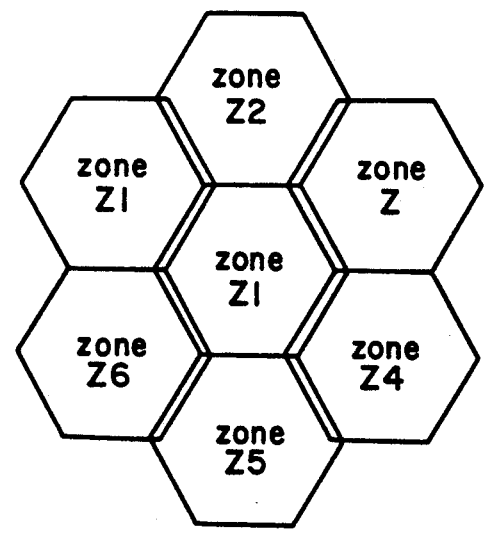
FIG. 7b

METHOD AND APPARATUS FOR LOCATING WHICH ZONE AND SECTOR OF A MOBILE COMMUNICATION SYSTEM A MOBILE STATION IS IN

BACKGROUND OF THE INVENTION

1. Technical Field

This invention is applicable to mobile radio communication. This invention relates, more particularly, to a method and apparatus for deciding in which sector of a mobile communication system a mobile station is in, where a radio zone (referred to as a zone herein) covered by one base station is divided into several sectors in operation.

2. Description of the Related Art

In the prior art mobile communication system, a zone is divided into plural sectors and each sector is covered by an antenna having directivity. Such method is advantageous in that interferences between sectors can be reduced by the directivity of the antennas, and the frequency utilization efficiency is improved as the distance between cells which are using the same frequency channels is shortened. In this type of mobile communication system, it is necessary for a mobile station to find out the serial number zone and of the sector in which the station is in at the time to set up a voice channel before the start of communication.

Even in the prior art mobile communication system where a zone is not divided into sectors, a mobile station sometimes must decide in which zone it is in. In the system where different zones are assigned different frequencies respectively, a mobile station scans control channels assigned to the zones, and detects a zone in which the station is in from the frequency (the serial number) of which control channel the station could receive. Similarly, in a different prior art mobile communications system if a zone is divided into sectors, it is possible for a station to discriminate a sector by its frequency. In other words, sectors are assigned with control channels of different frequencies, and a mobile station decides in which sector it is in by detecting the frequency or channel it can receive; or if a plurality of such channels exists, by measuring receiving levels of these frequencies, comparing them and discriminating the one with the maximum reception level.

However, in such a system of locating the sector in which one mobile station is in from the sector frequency, as sectors are assigned with a control channel of different frequencies, the number of frequencies for control channels is much larger than the number required for the system in which control channels are assigned to different zones. For instance, if the zones are assigned with control channels of different frequencies in the unit of nine zones, and the same frequency is repeatedly assigned to the next unit of nine zones or the 10th zone, then the number of necessary frequencies is nine. But if the sectors are assigned with different frequencies, a zone is divided into six sectors, and the zones are grouped in the unit of seven, 42 frequencies (6×7=42) will be required for control channels as the same frequency is reassigned only to the 8th zone. Even if the system has a comparatively simple structure as above, the required number of control channels is as much as five times more.

Moreover, the number of control channels which one mobile station receiver must scan for discriminating the sectors is large. Further, as it generally takes a certain amount of time to monitor the receiving level of a channel, the time required from activation of the power switch of a mobile station to when communication is ready with a set up control channel becomes inconveniently long.

In the above conventional system, moreover, when one mobile station moves across the boundary of sectors, the number of frequencies it must scan in order to detect the next control channel is so large that the station takes much time for detection and control of movement between sectors to conduct switching between the control channels smoothly. As the mobile station moves further during the delay in detection and control, the receiving strength becomes lower than the marginal level at which a mobile station could receive control signals. Occasionally, switching of control channels becomes inoperable. Because one control channel can only cover a narrow area in such a system, the frequency of channel switching increases, and the possibility of not receiving the paging signals during such channel switching increases proportionally. Due to the above reasons, reliability of receiving the paging signals and channel switching control is deteriorated.

In such a system, the same information is often transmitted to all the sectors such as in the case of paging. In such a case, efficiency in utilization of frequency is low as the sectors must be assigned with different frequencies.

In order to overcome the defects of the system where sectors are assigned with different control channels, there has been proposed a practical system where each zone is assigned with control channels of the same frequency. However, the system cannot rely on the aforementioned method to locate a sector where a mobile station exists simply by scanning the frequencies of control channels and detecting the frequency with the maximum receiving level. Instead, a base station measures an upward control channel signal issued from a mobile station and compares with other signals to locate the relevant sector. (The signal generated by a mobile station for a base station is called an upward signal while the one generated from the base station for mobile stations is called a downward signal). In these systems where locating of a sector should be done on the side of the base station, when a mobile station turns on the power source at the start, or when the zone where it is in needs to be located, the station first scans the frequencies of control channels assigned to different zones, measures and compares the receiving levels thereof, discriminates the control channel frequency which has the maximum receiving level, and uses the frequency of the upward control channel corresponding with the discriminated frequency. When a mobile station receives or originates a call, as the mobile station uses an upward control channel to transmit a signal to the base station, the base station receives the upward signal by using an individual receiver allocated to each sector. The base station measures and compares the levels at which each of the receivers receives the signal, detects the sector in which the relevant mobile station is in from the number of the individual receiver with the maximum level. In this system, the burden imposed on the base station becomes great as the individual receivers for the sectors of a zone should measure and compares the levels.

When an upward signal is received to measure its level, if the length of the signals generated from a mobile station is too short, it cannot be measured sufficiently. Due to the changes in level by fading, sectors sometimes cannot be precisely discriminated. In the system where the bit transfer speed of signals is set at a high rate, the signal length generally becomes short to deteriorate precision in sector discrimination. Poor precision in the sector discrimination means a high possibility for connecting a wrong remote base station. In other words, the zones should be defined larger equivalently. This makes the distance which permits reassignment of the same frequency longer, the frequency utilization efficiency lower, and the capacity of subscribers of the whole system incapable of extension.

SUMMARY OF THE INVENTION

This invention solves such problematic aspects of the prior art, and provides a system and method wherein a base station can be built with simple facilities without requiring measurement and comparison of levels. This invention further provides a system where the frequency utilization efficiency is high. This invention provide a system which has a high precision in sector discrimination. This invention provides a system of locating a sector where a mobile station exists with a higher reliability of paging signal reception.

This invention relates to a decision method and apparatus for locating a sector in which a mobile station exists, comprising plural mobile stations including transmitter/receivers thereof, and a base station which includes transmitter/receivers for communicating with plural mobile stations, wherein each of the plural zones is divided into sectors, said transmitter/receivers of the base station include a first transmitter/receiver means which transmits/receives signals of frequencies including the control channels assigned to each of said zones via a directive antenna, said each mobile station transmitter/receiver includes a second transmitter/receiver means which transmits/receives signals of frequencies including said control channels. The system of this invention is characterized in that said first transmitter/receiver means further comprises a transmitter means which transmits the signals of the sector individual frequencies assigned to different sectors via each directive antenna, said second transmitter/receiver means includes a receiver means which receives signals of the individual frequency of said each sector, a measuring means which measures the receiving level of the signals of the individual frequency of each sector and the signal of the frequency including each control channel, and a decision means which discriminates the zone and sector where the particular mobile station exists based on the result of the measurement.

The second transmitter/receiver means according to this invention is structured preferably with a detector means which compares the ratio of the receiving levels of signals of the individual frequency of a sector detected by said decision means as the sector where the station is present against the signal of the frequency of control channel of thus detected zone with a predetermined threshold value, and detects movement thereof between the sectors within the zone.

The transmitter means at the base station transmits signals of sector individual frequencies each allocated to a sector via a directive antenna. The receiver of a mobile station receives the output signal from said means while the measuring means measures the receiving levels of the signal of each sector individual frequency and of the signal of the frequency including each control channel. The decision means of the mobile station detects the own zone and sector of the station based on the frequency including the control channel with a higher receiving level and the sector individual frequency. With the above functions, the system can improve the frequency utilization efficiency, sector discrimination precision and paging signal reception reliability without the need to execute level measuring and comparing on the side of the base station. The same station can reduce the number of frequencies which the station should monitor by using the ratio in the receiving levels of the signal of the sector individual frequency and of the signal of the frequency which includes the control channel of the zone for detection of the movement between the sectors within the zone to thereby shorten the time required for detecting the movement and improve the intermittent ratio.

BRIEF DESCRIPTION OF THE DRAWINGS

FIGS. 4a and 4b are frame formats of a control channel of the decision method for locating a sector of a mobile station according to this invention.

FIG. 5 is a view to show the movement between zones of the decision method for locating a sector of- a mobile station according to this invention.

FIG. 6 is a view to show the movement between sectors within a zone of the decision method for locating a zone of a mobile station according to this invention.

FIGS. 7a and 7b are views to show the sectors adjacent to the sector where a mobile station exists of the decision method for locating a sector of a mobile station according to this invention.

DESCRIPTION OF THE PREFERRED EMBODIMENTS

Figure 1:
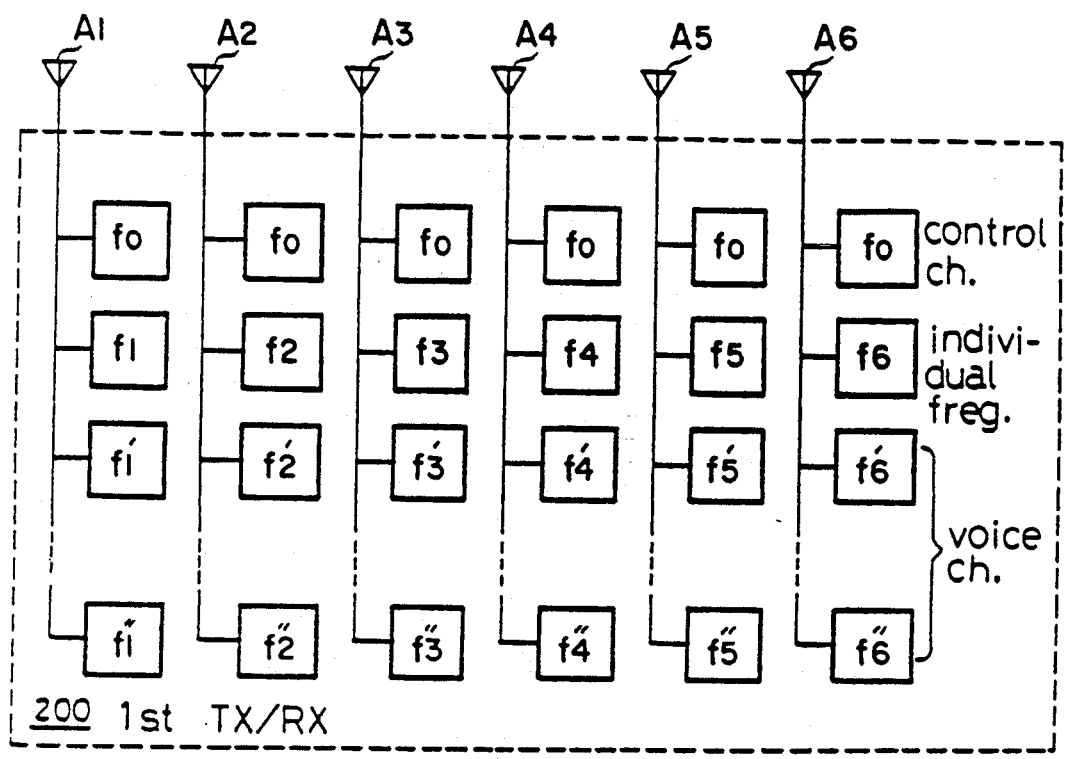
FIG. 1 is a block diagram of a base station transmitter/receiver of the first embodiment of the decision method for locating a sector of a mobile station according to this invention.
Figure 2:
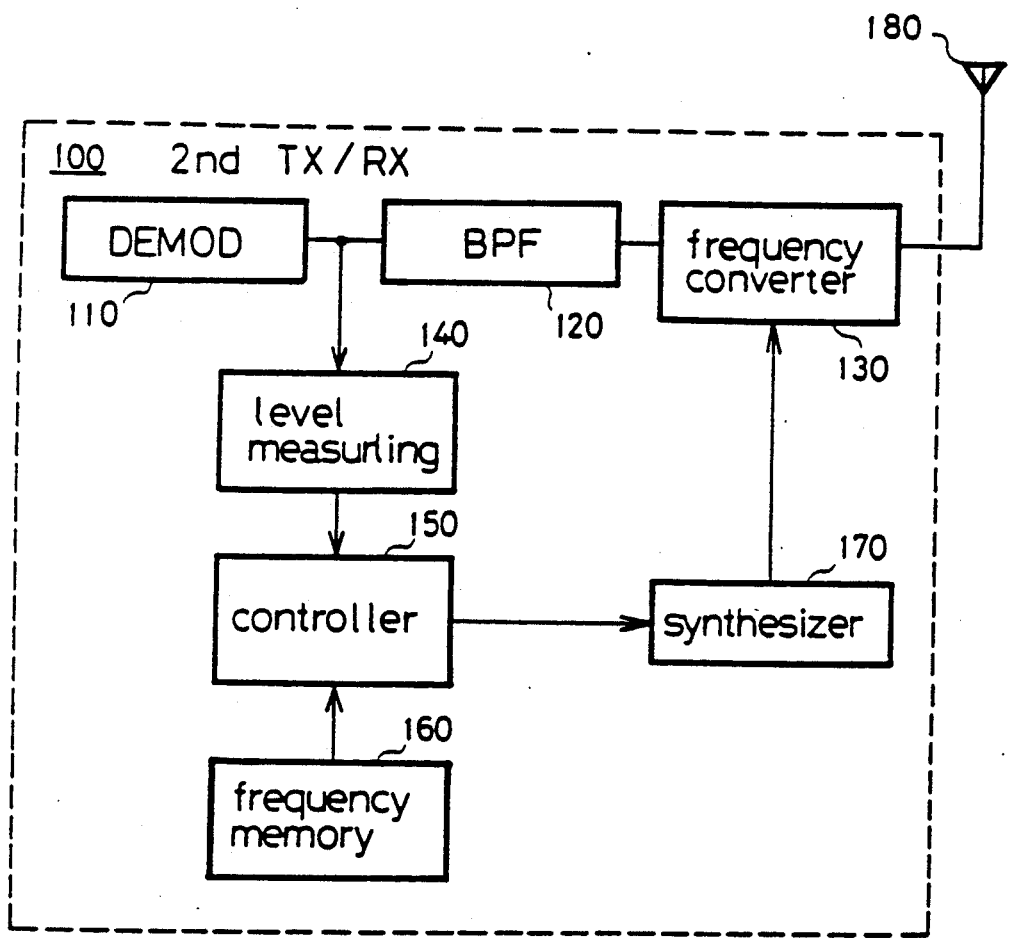
FIG. 2 is a block diagram of a mobile station transmitter/receiver of the first embodiment of the decision method for locating a sector of a mobile station according to this invention.

This invention will now be described by referring to embodiments shown in the attached drawings. FIG. 1 is a block diagram of an embodiment of the base station transmitter/receiver of the decision method for locating a sector of a mobile station according to this invention. FIG. 2 is a block diagram to show an embodiment of a mobile station transmitter/receiver of the decision method for locating a sector of a mobile station according to this invention. From FIG. 3, the relation between a zone and sectors will be easily understood.

Referring now to FIGS. 1 and 2, the system includes plural mobile stations having transmitter/receivers, a base station having a transmitter/receiver to communicate with said mobile stations, and zones each of which is further divided into sectors. The transmitter/receiver of the base station includes a first transmitter/receiver means 200 which transmits or receives signals of the frequency $f_0$ including a control channel which is assigned to each of the zones via directive antennas $A_1$ through $A_6$. The transmitter/receiver of each mobile station comprises a second transmitter/receiver means 100 which transmits/receives signals of the frequency $f_0$ including the control channel and an antenna 180. The second transmitter/receiver means 100 comprises a demodulator 110, a band pass filter 120, a frequency converter 130, a control unit 150 and a part of a synthesizer 170.

This invention system is characterized in that said first transmitter/receiver means 200 includes transmitter means which transmits signals $f_1$ through $f_6$ of sector individual frequencies assigned to respective sectors via directive antennas $A_1$ through $A_6$. The second transmitter/receiver means 100 includes a receiver means which receives signals $f_1$ through $f_6$ of said sector individual frequencies, a level measuring circuit 140 as a measuring means which measures the receiving levels of the signals of sector individual frequencies and of the signals of the frequencies of the control channels, a part of the control unit 150 and a frequency memory 160 as the means for deciding which discriminates the zone and sector for the station based on the result of the measurement by the circuit 140.

Figure 3:
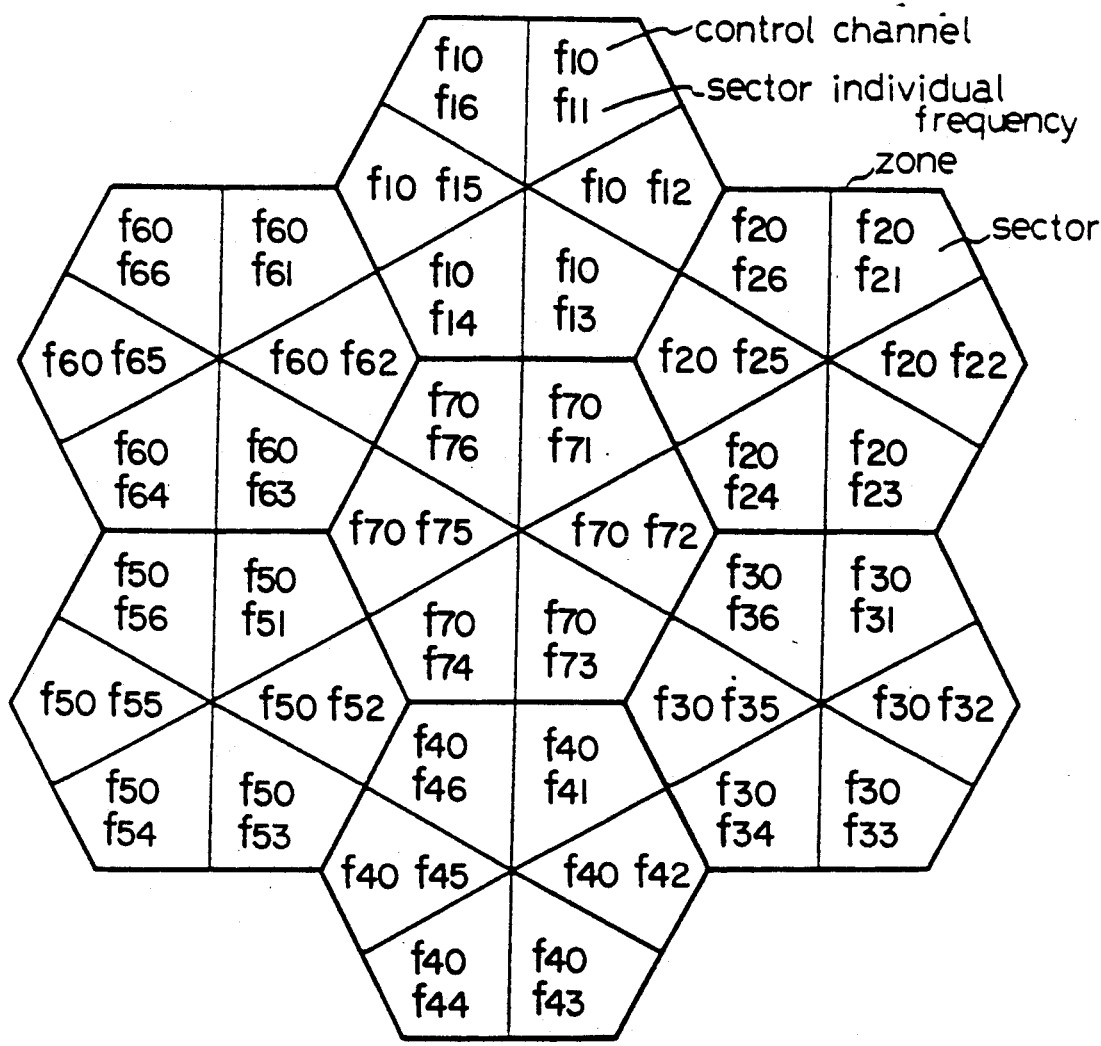
FIG. 3 is a structural view of a control channel and sector individual frequency of the decision method for locating a sector of a mobile station according to this invention.
Figure 8:
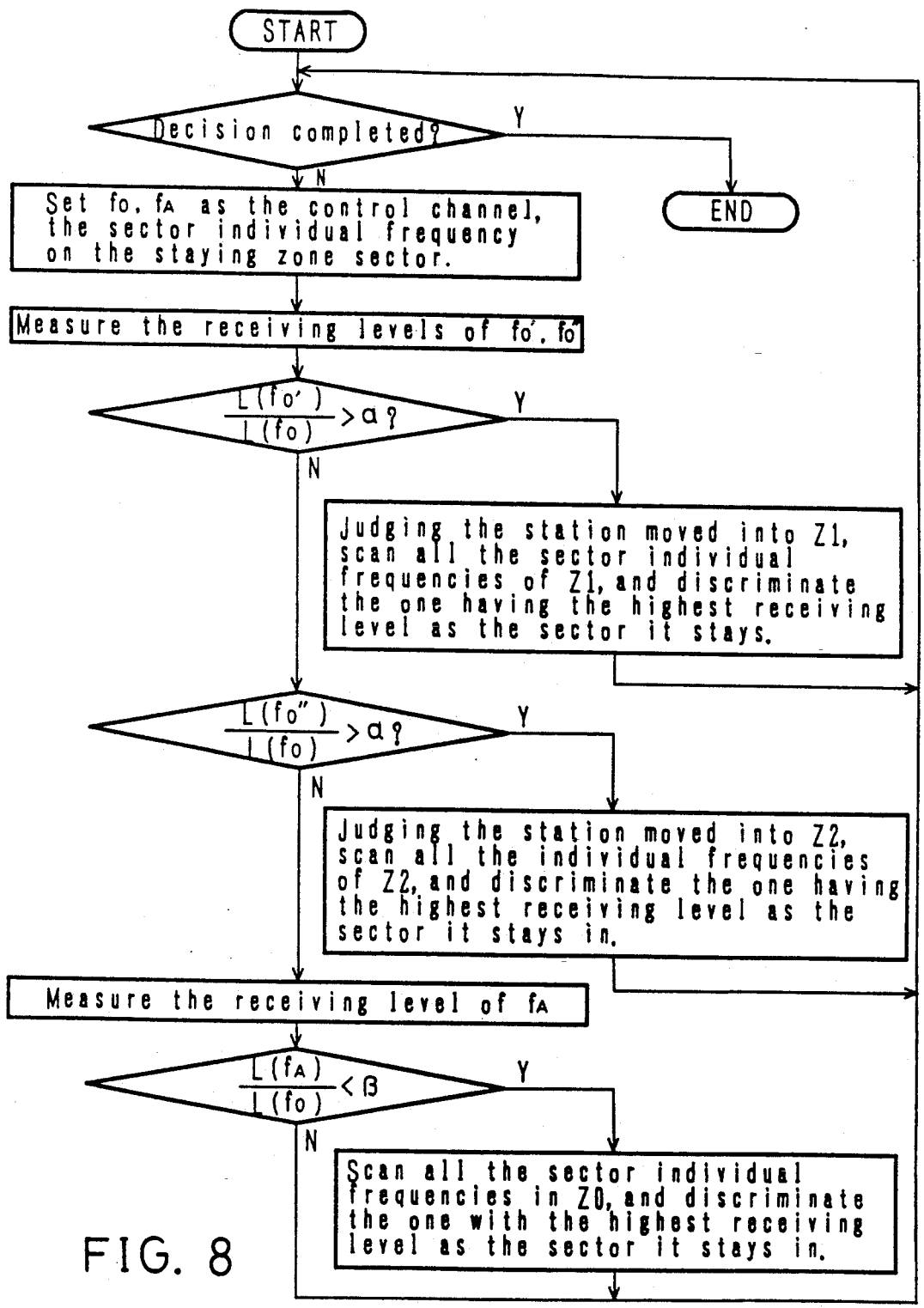
FIG. 8 is a flow chart of the operation to detect the movement between sectors in a zone of the decision method for locating a sector of a mobile station according to this invention.
Figure 9:
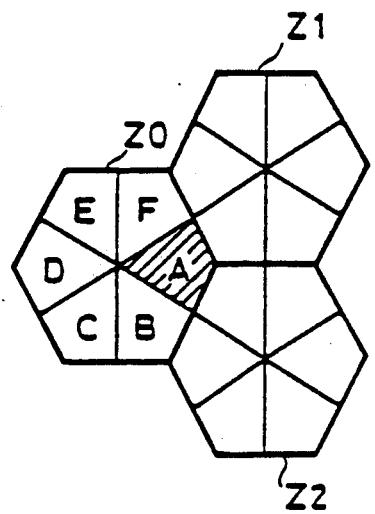
FIG. 9 is a view to show the arrangement of zones and sectors of the decision method for locating a sector of a mobile station.
Figure 10A:
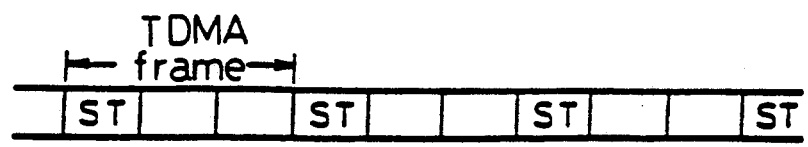
FIGS. 10a and 10b are formats of voice channel of the decision method for locating a sector of a mobile station according to this invention.
Figure 10B:
Figure 11:
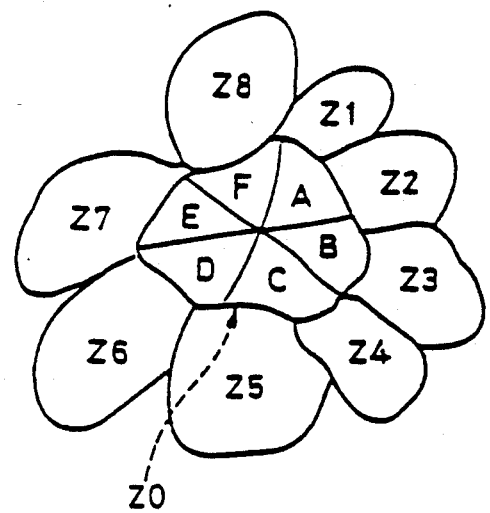
FIG. 11 is a view to show another arrangement of zones and sectors of the decision method for locating a sector of a mobile station.
Figure 12:
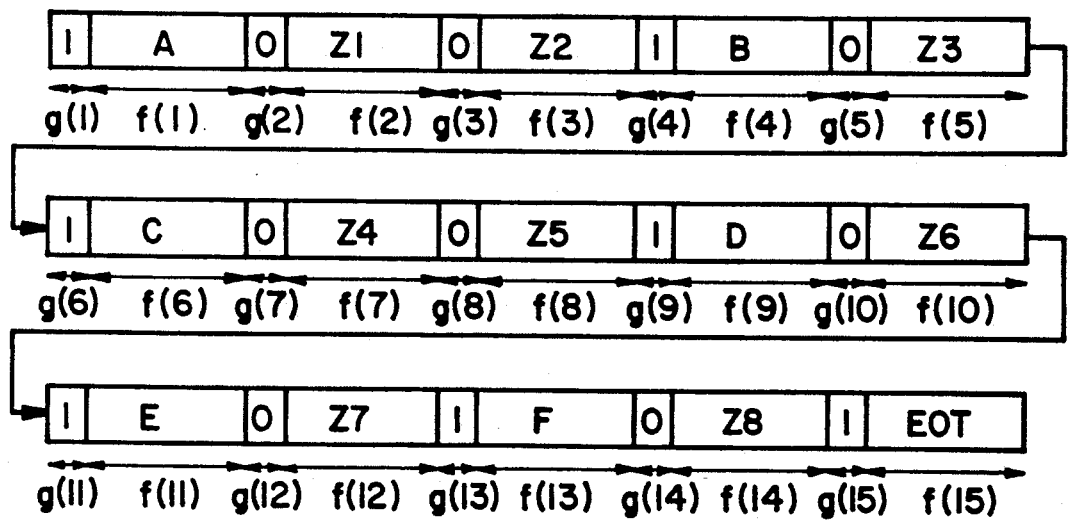
FIG. 12 is a frame format of broadcasting information of a base station of the decision method for locating a sector of a mobile station according to this invention.
Figure 13:
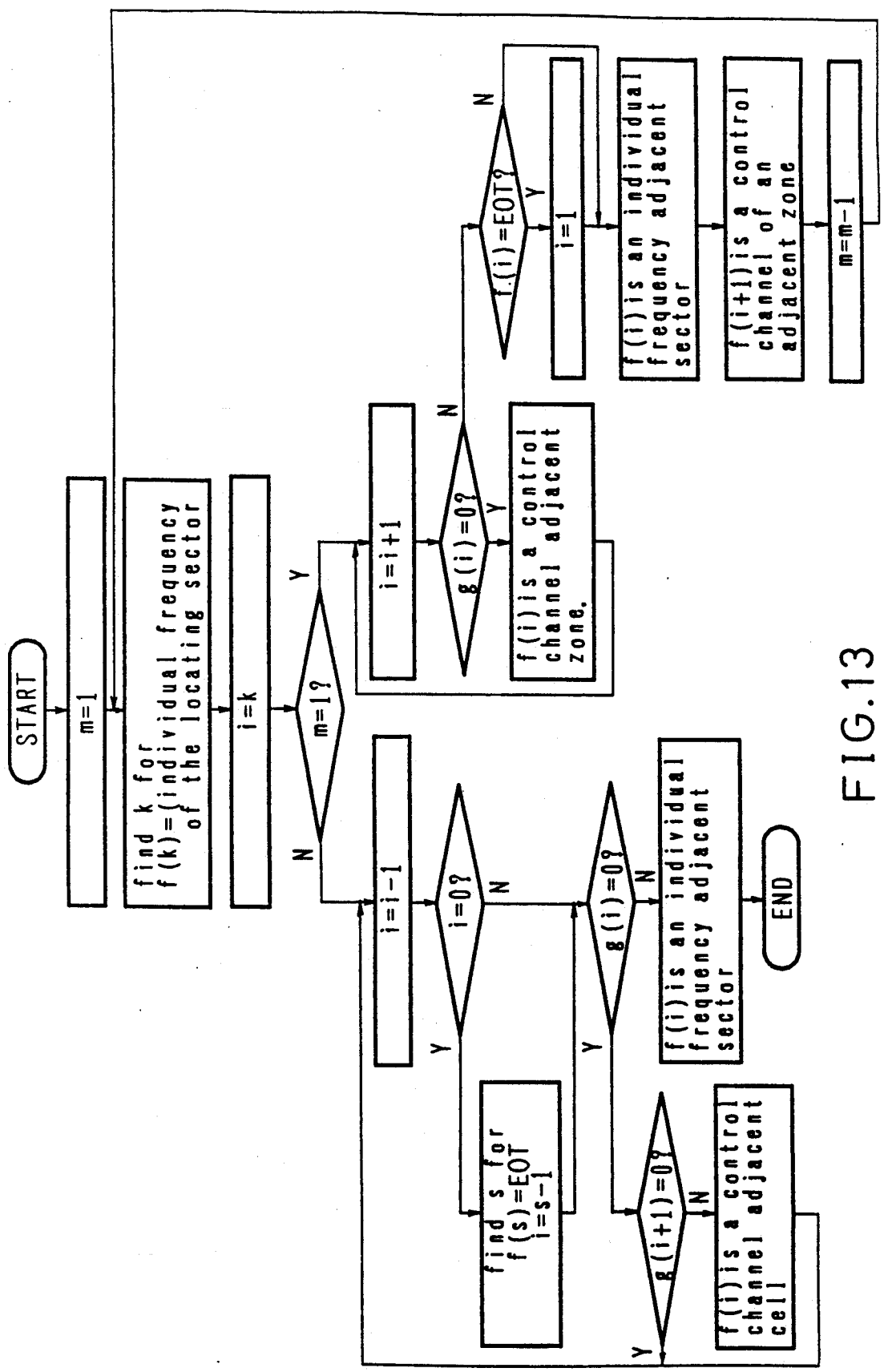
FIG. 13 is a flow chart of the operation to obtain the control channels of the adjacent zones and individual frequencies of the adjacent sectors based on the broadcasting information from the base station of the decision method for locating a sector of a mobile station according to this invention.
Figure 14:
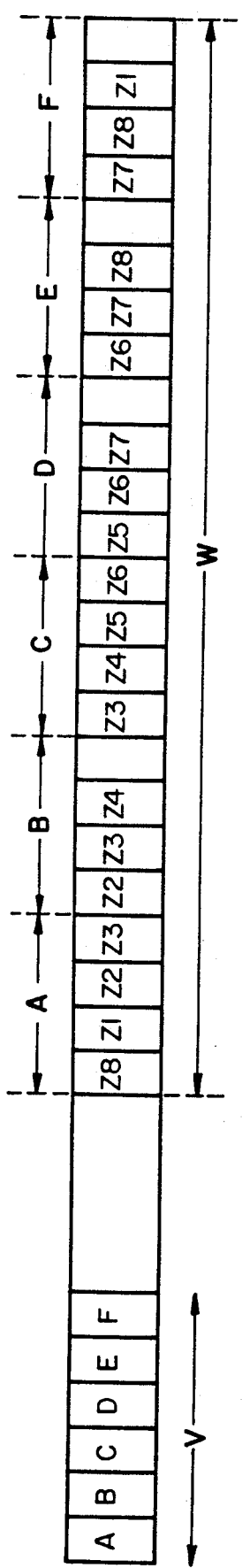
FIG. 14 is a frame format of broadcasting information of another base station of the decision method for locating a sector of a mobile station according to this invention.
Figure 15:
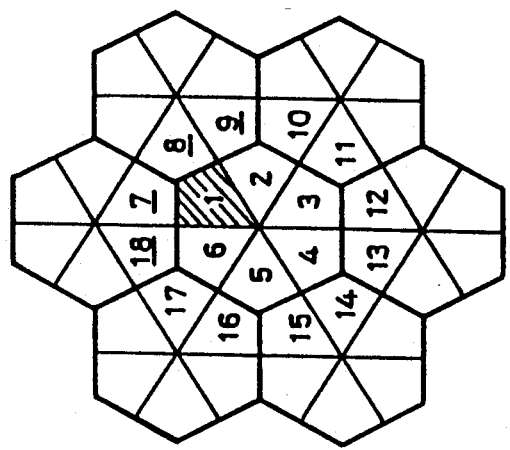
FIG. 15 is a chart to show correspondence between the order of identification numbers of sector individual frequencies broadcast from a base station of the decision method for locating a sector of a mobile station according to this invention.
Figure 16:
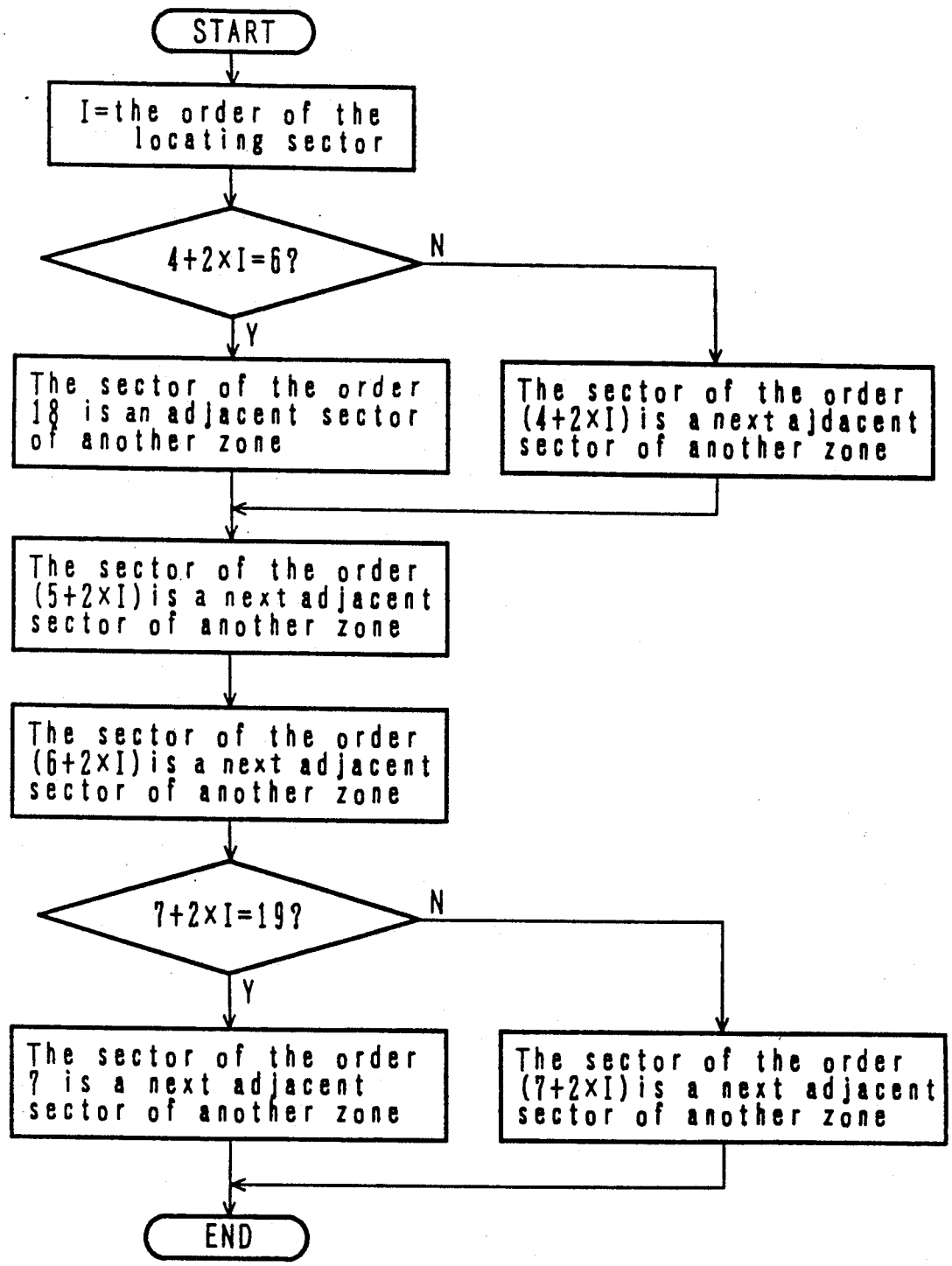
FIG. 16 is a flow chart of the operation which detects the individual frequencies of adjacent sectors from the broadcast sector individual frequency of the decision method for locating a sector of a mobile station according to this invention.
Figure 17:
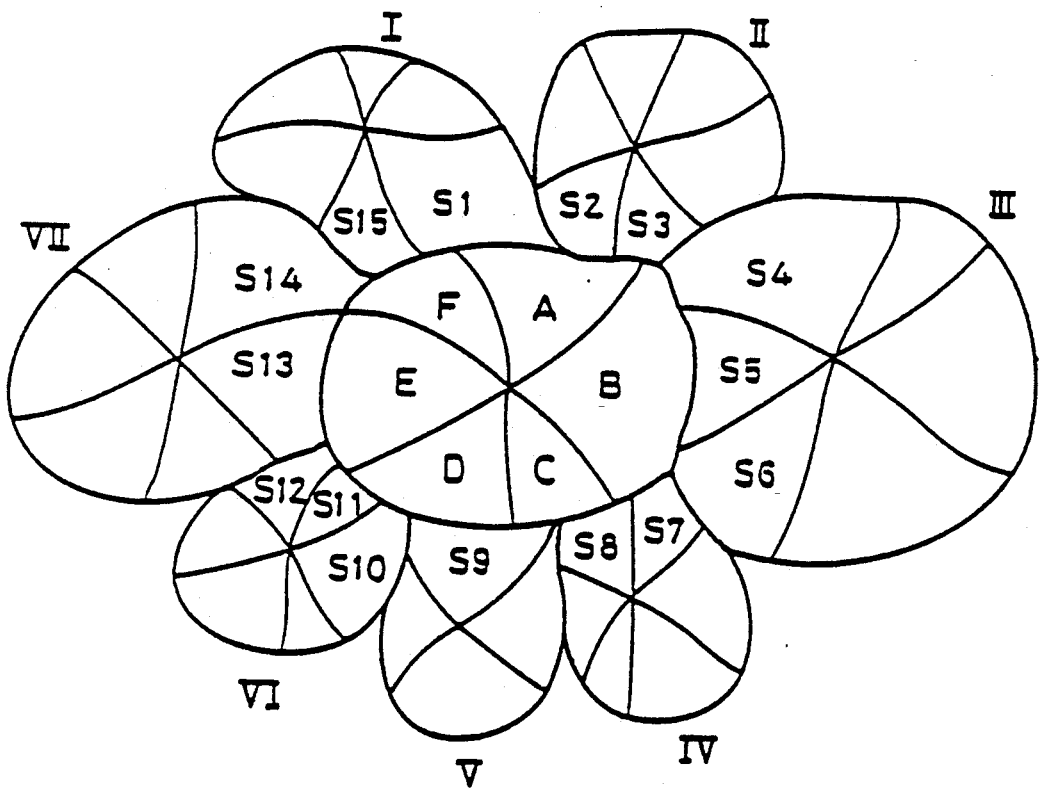
FIG. 17 is a view to show an irregular zone/sector arrangement of the decision method for locating a sector of a mobile station according to this invention.
Figure 18:
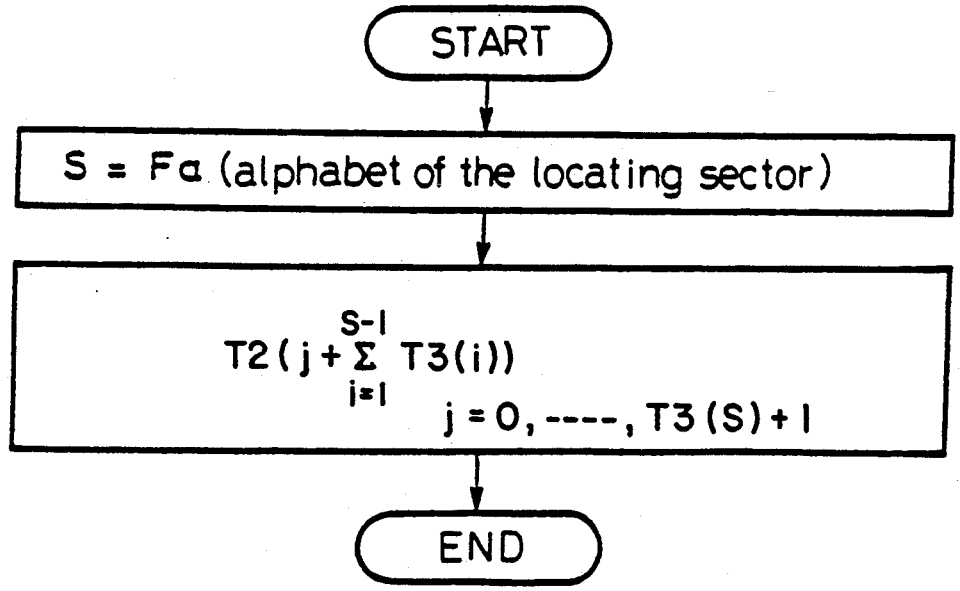
FIG. 18 is a flow chart of the operation which detects adjacent sector individual frequencies of the other zones from the broadcast information of the decision method for locating a sector of a mobile station according to this invention.
Figure 19:
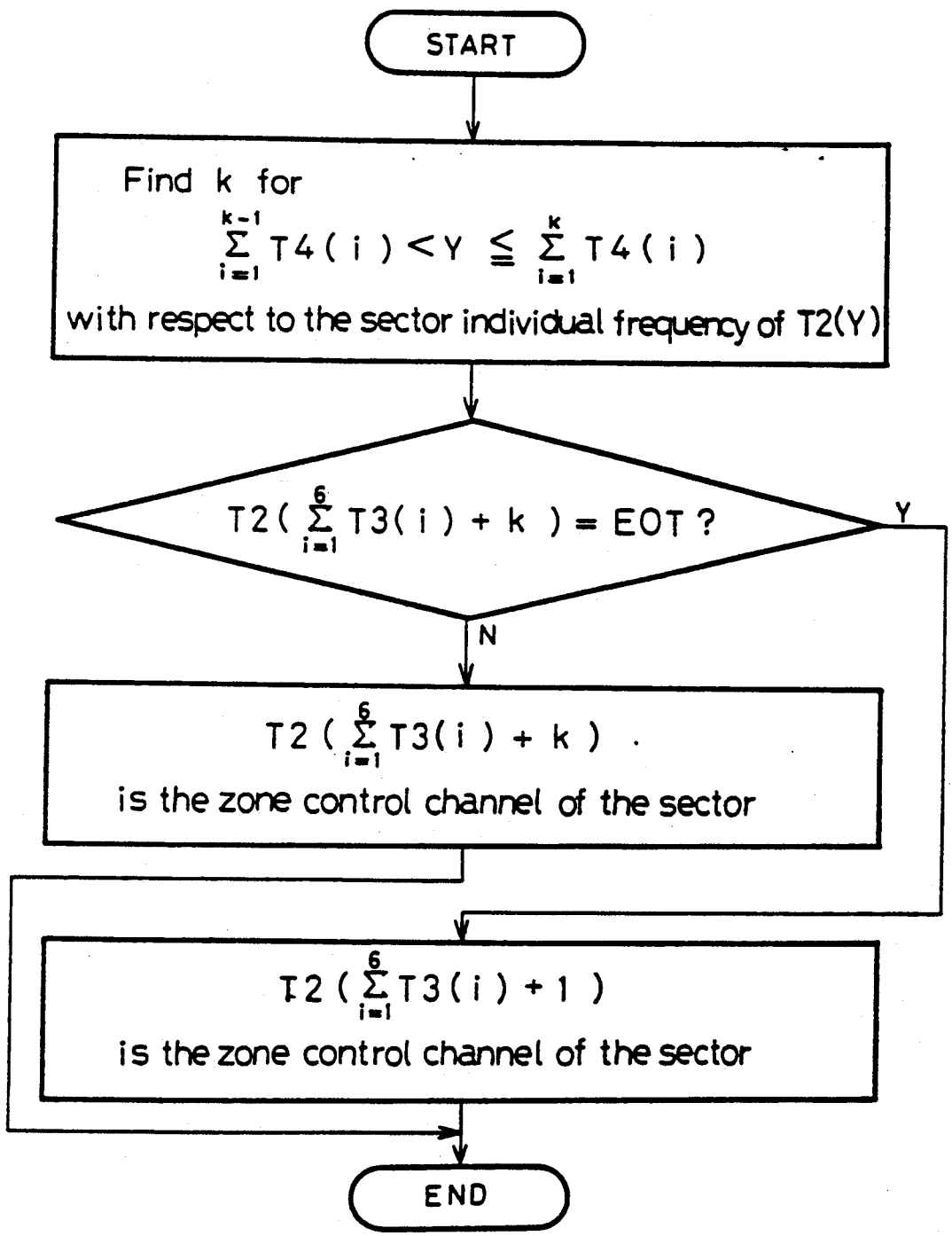
FIG. 19 is a flow chart to obtain zone control channels of adjacent sectors of another zone from broadcasting information of the decision method for locating a sector of a mobile station according to this invention.

The decision method for locating a sector of a mobile station will now be described in respect of the operation. FIG. 3 is a structural view to show the relation of control channels and sector individual frequencies of this invention system. FIGS. 4a and 4b are frame formats of the invention system. FIG. 5 is a view to show the movement between zones of this invention system. FIG. 6 is a view to show the movement between sectors of a zone in which a mobile station exists. FIGS. 7a and 7b are views to show sectors adjacent to the sector in which a mobile station stays according to the present invention. FIG. 8 is a flow chart to show the operation for detecting movement of a station between sectors of a zone according to this invention system. FIG. 9 is a chart to show a zone/sector arrangement of this invention system. FIGS. 10a and 10b are formats of voice channel of this invention system. FIG. 11 is a view to show another zone/sector arrangement of this invention system. FIG. 12 is a frame format of broadcasting information from the base station thereof, FIG. 13 is a flow chart of the operation for detecting the control channels of adjacent zones and adjacent sector individual frequencies based on the broadcasting information thereof, and FIG. 14 is a frame format of still another broadcasting information from the base station thereof. FIG. 15 is a chart to show correspondence between the order of identification numbers of the sector individual frequencies which is broadcast from the base station and the sector arrangements of the system, FIG. 16 is a flow chart for obtaining the individual frequencies of sectors adjacent to the sector where the mobile station stays out of the informed sector individual frequencies, FIG. 17 is a view to show the irregular zone and sector arrangement of this invention system, and FIG. 18 is a flow chart to obtain individual frequencies of adjacent sectors in other zones out of the broadcasting information of this invention system. FIG. 19 is a flow chart to obtain control channels of the adjacent sectors in other zones in the system thereof.

Table 1 shows correspondence between the zones and the control channels of this invention system, Table 2 correspondence of the sectors and the sector individual frequencies, Table 3 the content of non-volatile memory of the mobile station transmitter/receiver, and Table 4 correspondence between the frequencies which a mobile station should store and the identification numbers thereof in a system where a base station broadcasts the sector individual frequencies of the system. Table 5 shows correspondence between the order of broadcasting from the base station and the identification numbers of the system, and Table 6 shows tables which the base station broadcasts to mobile stations in the system according to this invention.

In FIG. 3, $f_{10}$, $f_{20}$, $f_{30}$, $f_{40}$, $f_{50}$, $f_{60}$, and $f_{70}$ denote frequencies of the control channels assigned to respective zones. In FIG. 3 $f_{11}$-$f_{16}$, $f_{21}$-$f_{26}$, ..., $f_{71}$-$f_{76}$ denote the sector individual frequencies which are constantly transmitted from the base station. FIG. 1 shows a structure where a zone is divided into six sectors wherein each of the antennas $A_1$ through $A_6$ is allocated to each sector. Antennas $A_1$ through $A_6$ are respectively connected to transmitter/receivers of the frequency $F_0$ of the control channel of the zone, the sector individual frequencies $f_1, f_2, f_3, f_4, f_5, f_6$ and voice channels of the sectors. Although the system shown in FIG. 1 is structured to have the transmitter/receivers for the frequencies $f_0$ of control channels in the number corresponding to that of sectors, signals from one transmitter/receiver may be distributed to the power supply sections of sectors.

In FIG. 2, the level measuring circuit 140 is the circuit for measuring the receiving levels of the signal frequencies, the synthesizer 170 is controlled by the controller 150, and the frequencies are selected by the converter 130 and the band pass filter 120.

When a power switch is turned on, a mobile station scans control channels assigned to zones to measure the receiving levels and compare them. In minimizing errors due to fading, it is more effective to switch to a high speed and repeat short measuring cycles for plural times per frequency rather than to measure levels of a frequency once. The scanning time may be shortened by omitting the frequencies with the levels which are formed extraordinarily low by the first measurement. From the result of scanning, the control channel with the strongest receiving level is judged as the zone in which the particular mobile station is in.

The mobile station scans the sector individual frequencies of the zone when the receiving channel of the control channel is not used, measures the receiving levels and compares them in order to render sector judgement. It is quite obvious from FIG. 4(a) that a control channel has blank sections not used for reception. The letter X in FIG. 4(a) denotes a broadcasting section and Y a paging section. As the paging section is divided into subsections and a mobile station receives paging information only of a sub-section to which it belongs, the station does not have to receive control channels of the zone of the paging sections of other sub-sections. This produces blank time and permits receiving other frequencies. In the FIG. 4(b), shaded sections denote blank times of the paging section Y of the group of the mobile stations. Because there are blank times in the control channels for receiving, the mobile station can receive and at the same time measure the sector individual frequencies and judge that the sector having the sector individual frequency with the strongest receiving level is the sector in which the station exists.

Operation is described for the zone/sector discrimination for the time of turning on the switch referring to the case of FIG. 4 where control channels are structured to repeat the same frequency in the unit of seven zones. It is assumed that the sector in which the particular mobile station stays is the sector having the individual frequency of $f_{73}$. The mobile station first scans the control channels $f_{10}$, $f_{20}$, ..., $f_{70}$. Then, it scans the sector individual frequencies $f_{71}$, $f_{72}$, ..., $f_{76}$ of the zone of which control channel is $f_{70}$ and judges that the sector where the station stays is $f_{73}$.

After judging the sector for activation, the mobile station advances to the state of waiting for paging. While waiting, the mobile station is constantly moving, the movement thereof between the sectors and the zones are monitored. The mobile station can learn its movement between zones by monitoring control channels which are assigned to zones respectively in one-to-one relation, and learn movement between sectors in the zone by monitoring the sector individual frequencies. For instance, when a mobile station moves as shown in FIG. 5, as the control channel having the strongest receiving level moves from the zone Z1 to the zone Z2, the station can learn that it has moved from the zone Z1 to the zone Z2. In the case where a station moves from one sector to another sector of the same zone, as shown in FIG. 6, the strongest receiving level changes from the sector individual frequency of the sector S1 of the six sectors of the zone to that of the sector S2, and it becomes obvious that the station moves from the sector S1 to the sector S2. Although the movement between the cells is learned by monitoring the control channels in the above example, the movement between both sectors and zones in the waiting state may be learned by monitoring the sector individual frequencies alone. It may be learned by measuring and comparing the receiving levels of individual frequencies of sectors adjacent to the sector where the mobile station exists irrespective of zones. As shown in FIG. 7a, if it is assumed that the station is in a sector S1, the station measures and compares the receiving levels of the individual frequencies of adjacent sectors, the sectors S2 through S6 of the same zone and the sectors S7 through S10 of other zones where the station can possibly move to. If the receiving levels are strong in the sectors S2 through S6, it is judged that the station moves within the zone. On the other hand, if they are strong in the sectors of S7 through S10, it is judged that the station moves to another zone. As shown in FIG. 7b the control channels at the zones can overlap somewhat.

If the number of sector individual frequencies is reduced, it may shorten the detecting time of the movement. The reduction of the number of sector individual frequencies means an increase in time where no reception is being made, or an improvement of intermittent ratio. In other words, it saves consumption power of a mobile station, especially of a portable unit, prolongs the life of a battery, and improves the quantity of service. A scan of only the sectors of higher probability to move to can be performed and then, if necessary, to scan other sectors of lower possibility rather than to scan all of the adjacent sectors. For instance, in the case shown in FIG. 7a, if the mobile station stays in the sector S1, the sectors of S2, S6, S8 and S9 which contact linearly with the sector S1 are scanned first. If any higher receiving level is not obtained even after scanning them, then other sectors are scanned as the station may have moved to others. In this method, the number of sectors which are monitored is 4. Compared to the method where all the sectors including those contacting the sectors 1 with points are monitored, the number decreased from 10 to 4 or less than a half to thereby save time. The method of scanning from the sector of higher probability may be used for monitoring the control channels. The number of scanning may be reduced if the monitoring of a control channel of a zone having a higher probability in movement is preferentially scanned.

The above mentioned monitoring of the movements between the zones and sectors is the method of scanning the frequencies of adjacent zones, comparing them and discriminating the frequency with the strongest receiving level as the frequency of the zone or sector where a particular mobile station exists. However, the movement between the sectors in a zone may be monitored by another method. Instead of constantly monitoring individual frequencies of the adjacent sectors of the zone, the method usually monitors only[the individual frequency of the sector where the station exists]/[control channel of the zone in which the station exists]. As the control channels are of the same frequency for all of the sectors of the zone, there is hardly any directivity in the level distribution thereof. But the sector individual frequency differs from one sector to another and has directivity; in other words, the receiving level may be strong in one sector but weak in another. As (the individual frequency of the sector where a station exists)/- (control channel of the zone where the station exists) is close to 1 in the sector where the station is in and is close to 0 in other sectors, when a mobile station moves across the boundary between the two sectors, the ratio of the individual frequency of the sector as against the control channel of the zone where it stays decreases and the mobile station can learn from the decrease that it moves from one sector to another within the same zone. After moving out of the sector, the mobile station measures and compares the frequency of the sector adjacent to the former one or the one it moves into, and judges into which sector it moves.

This method is advantageous as it can shorten the time for detecting and improve the intermittent ratio as it usually must monitor only the ratio of the individual frequency of its own sector against the control channel of the zone thereof. FIG. 8 shows the flow chart of the operation wherein the above method is applied to monitoring of the movement between the sectors of a zone. In the operation shown in FIG. 8, in addition to the aforementioned monitoring, the monitoring of control channels of adjacent zones is used in order to detect the movement between the zones. In FIG. 8, the relation holds as;

Function L $(f_i)$ = (measured value of the receiving level of the frequency $f_i$)

The symbols $\alpha$ and $\beta$ denote constants. The zone/sector arrangement is shown in FIG. 9, and the control channels and the individual frequencies are assigned as shown in Table 1. The zone and the sector where the particular mobile station stays are Z0 and A respectively. The symbols used in relation to FIG. 9 such as Z0, Z1, Z2 or A, B, C, ... are relative symbols for the zone or sector where the station exists and will be changed when the station moves. As is obvious from FIG. 8, a mobile station measures the control channel of the zone $f_0$ where it is in and control channels $f_0'$ and $f_0''$ of the adjacent zones and detects the movement between the zones. When the station finds that it has not moved between the zones, it measures the sector individual frequency $f_A$, detects the ratio of $f_A/f_0$ and monitors the movement between the sectors. If the ratio $f_A/f_0$ becomes lower than a certain value $\beta$, the station is likely to have moved from one sector to another. The receiving levels of the individual frequencies of sectors of the same zone, $f_B$, $f_C$, $f_D$, $f_E$, $f_F$, are measured and compared, and the sector having the individual frequency with the highest receiving level is judged to be the sector to which the station has moved. If the value $\beta$ is set high, as it scans the individual frequencies of sectors within the same zone faster when the station moved between sectors, the intermittent ratio decreases while judgement becomes easier. The value $\beta$ may be set considering the tradeoff between the intermittent ratio and judgement precision.

The foregoing explanation has been given to the case of judging a zone and a sector when the power is turned on or during waiting, but this system may be applied to the zone/sector decision during a voice communication. In such a case, a method which switches to another frequency in a time slot other than the communication slot by using TDMA (time division multiplex access method) or a method wherein a receiver for level monitoring is installed at a mobile station should be applied. The communication channels at TDMA may be structured as shown in FIGS. 10a and 10b wherein the slot used for the communication is a part of the TDMA frames. A zone or sector may be judged as in the waiting time by using the blank time as such blank times are produced when not receiving the voice channels. The letters ST in FIG. 10(a) denote a slot used for the communication while the shaded portions in FIG. 10(b) denote blank times.

As the above mentioned sector decision method according to this invention does not require measurement nor comparison of receiving levels on the side of the base station, the burden on the base station is not heavy since the control channels and the sector individual frequencies of a mobile station are measured and compared in the receiving levels. As the sector individual frequencies are constantly transmitted, a mobile station can receive signals of a sufficient length and measure the receiving levels for a sufficient time to thereby enable precise decision of a sector.

As the control channels are assigned to zones rather than sectors, the frequency utilization efficiency of the channels is quite high.

Compared to the case wherein control channels are assigned to sectors, the number of scans for the frequencies during the time from switching on to the sector decision and the number of scans of the frequencies when movement is judged are smaller to thereby minimize the time required to judge the sector. For instance, if channels are assigned to sectors respectively and sectors are grouped in the unit of six and repeated in the unit of seven zones, the number of scans for the control channels is $6 \times 7 = 42$. According to the method of the present invention wherein the same frequency is reassigned in the unit of nine zones, the control channels are scanned for nine times and sector individual frequencies are scanned for six times to total 15; $(9+6=15)$. Therefore a sector can be decided within about one third of the conventionally required time.

In the system according to this invention, the number of the frequencies which should be scanned before a control channel is detected and the state becomes ready for paging is nine. If control channels are assigned differently to sectors, the number of frequencies scanned is 42. The system of the present invention becomes therefore "ready state" within about one fifth of the time conventionally needed. The time needed for turning on to the ready state is shortened, and the time needed from switching the control channel for the different zone and preparing for the ready state is also reduced. Further, as control channels are assigned to zones and as the same control channel is used within a zone, the control channels do not need to be switched from one to the other for movement between the sectors in a zone. This makes paging possible even if the decision of a sector is delayed or erroneously made.

The first embodiment for a mobile station to learn the sector individual frequency is the method in which the sector individual frequency stored by the station in a non-volatile memory. Table 3 shows the structure of the contents stored in a memory. The letters $f_{10}$-$f_{70}$ denote frequencies of the control channels assigned to zones (or cells. The letters $f_{11}$-$f_{16}$, ..., $f_{71}$-$f_{76}$ denote sector individual frequencies. If the arrangement of the zones and sectors is regular, it is possible to learn the control channels and individual frequencies of adjacent zones and sectors out of the information stored in the non-volatile memory.

The second embodiment for a mobile station to learn the sector individual frequencies is the method in which a base station informs the sector individual frequencies to mobile stations. Alternatively, this method may be used for the control channels so that the base station informs the control channels of the zones adjacent to the zone where the mobile station is in. The method is advantageous as it can be flexibly used even if the arrangement of the zones/sectors is irregular when it should obtain the control channels of adjacent zones or the individual frequencies of the adjacent sectors. However, the amount of broadcasting information increases compared with the case where mobile stations store the information in memories, and it is preferable to reduce the amount of information. For this purpose, it is preferable to prepare a table which relates frequencies with identification numbers like Table 4 inside the mobile stations and broadcasting should be made with the ID numbers rather than frequencies. The content of broadcast information may be only the sector individual frequencies of a zone or the individual frequencies of the sectors of a zone where a mobile station exists and of the sectors adjacent thereto depending on the monitor method for the movement thereof. The number of control channels which are to be monitored may be reduced by informing not only the sector individual frequencies but also the control channels of the adjacent zones.

As an example of the case wherein a base station broadcasts to mobile stations the frequencies to be monitored, the base station informs the sector individual frequencies in the zone where it is in and the control channels of adjacent zones. Referring to FIG. 11 where the station is in the zone Z0, the control channel of the zone informs the individual frequencies of the sectors A through F of the zone and the control channels of the zones which are adjacent to the sectors as shown in FIG. 12. In FIG. 12, the parts marked with the letters A, . . . , F are the parts in which the sector individual frequencies of the sectors A through F will be informed and those marked with Z1 through Z8 are the parts in which the control channels of the zones Z1 through Z8 will be informed. $\overline{0}$ and $\overline{1}$ denote the bits for identifying the sector individual frequencies from the zone control channels. If it is assumed that the sectors F, A, B, and zones Z8, Z1, Z2, Z3 should be monitored while the mobile station is within the sector A, the mobile station will obtain them from the broadcasting information in accordance with the operation flow shown in FIG. 13. It is assumed that the functions f and g have the values shown in FIG. 12.

In FIG. 14 is shown another example of the broadcasting information structure where the sector individual frequencies of the zone wherein the mobile station is in and the control channels of adjacent zones should be informed. In FIG. 14, the letter V denotes parts in which the sector individual frequencies should be informed while W denote the parts in which the control channels of the zones adjacent thereto should be informed. For instance, if a mobile station is within the sector A in FIG. 11, the mobile station receives the part of the sector A of the sector individual broadcasting part V to learn its own individual frequency. Then, the station reads out the part of the sector A of the part W the adjacent zone control channels' broadcasting information to learn the control channels of the zones adjacent to its own zone are for Z8, Z1, Z2 and Z3. This method can improve the intermittent ratio as the mobile station of the sector A must receive the broadcasting information aimed at the sector A alone.

An example will be shown below for the case where both of the individual frequencies of the sectors of the zone in which the station exists and of the adjacent zones are broadcast. This method broadcasts to the mobile station the aforementioned information by arranging the identification numbers for the sector individual frequencies in an order shown in FIG. 15 and Table 5. FIG. 15 shows correspondence between the order of ID numbers of the sector individual frequencies to be informed and the sector arrangement while Table 5 shows correspondence between the order and the ID numbers. FIG. 16 shows in flow chart the method to obtain the sector in which a mobile station exists and its adjacent sectors by means of the table which is informed by the base station. For example, if the mobile station is in the sector of the order 1, adjacent sectors of the other zones will be the sectors of the order 18, 7, 8 and 9 from FIG. 16.

The method mentioned may be used for the case where the arrangement of zones and sectors is irregular. The method is exemplified below wherein the control channels of the adjacent zones is informed. FIG. 17 shows an irregular case wherein the sectors within the same zone are identified with letters A through F. In this case, the number of adjacent zones is seven and the number of adjacent sectors in the other zones which contact the zone B by line is six. This case is irregular compared to the case shown in FIG. 15 where the number of adjacent zones is six and the adjacent sectors of other zones is four. What the base station should inform are the ID number of the sector individual frequencies of the zone where the mobile station is in, the individual frequency ID numbers of the sectors in other zones on which the sectors of its own zone contact, and the control channels of the contacting sections of the other zones. The base station first of all informs the ID numbers of the sector individual frequencies of the zone where the mobile station is from the sectors A to F as shown in the first table or Table 6(a) in the alphabetical order.

Then, the adjacent sectors of the other zones correspond with the sectors of the zone where the mobile station stays. It prioritizes the sector which contacts with the other sector(s) most. For instance, as the sector S4 contacts only with the sector B, it is judged that it corresponds to the sector B. If a sector contacts with plural sectors like the sector S8 with the sectors B and C, the sector C is prioritized as it contacts with the sector S8 in a larger area, and judged to correspond with the sector S8. Then, the base station informs the number of adjacent sectors in other zones corresponding to the sectors A through F in the alphabetical order like Table 6(c).

Then, it informs the ID number of the adjacent sector individual frequencies of other zones corresponding to the sectors A through F in the order of the number in FIG. 17 like sectors S1, S2, . . . , S15 as shown in Table 6(b) starting from the sector corresponding to the sector A. The order is clockwise from the sector contacting with the Sector A. It also informs the control channels of the zones to which the sector S1 belongs in the clockwise order as shown under the column of the adjacent sector individual frequencies in Table 6(b). The order of notification is in the order of the zones numbered with I, II, ..., VII in FIG. 17. The data is read out from the Table 6(d) in order to learn the zones to which the adjacent sectors belong. The table groups the sectors in the unit of a zone and notifies the number of sectors of each zone starting from the sector S1. In this case, as they are grouped in (Sector S1), (S2, S3), (S4, S5, S6), (S7, S8), (S9), (S10, S11, S12), (S13, S14), (S15), it informs like ⌈1⌋, ⌈2⌋, ⌈3⌋, ⌈2⌋, ⌈1⌋, ⌈3⌋, ⌈2⌋, and ⌈1⌋.

FIGS. 18 and 19 show the method to obtain the individual frequencies of the adjacent sectors of other zones contacting with the sector in which a mobile station exists and the control channels of zones to which the sectors belong by means of the information of the broadcasting tables. In the figures, the function Fa is defined as follows.

$$Fa(A)=1, Fa(B)=2, \ldots, Fa(F)=6.$$

The letter $T_2(i)$ denotes the values which belong to the order i in the second table, $T_3(i)$ the values which belong to the order (i) of the third table and $T_4$ the values which belong to the order (i) in the fourth table.

$$\text{For special cases, } T2(0) = T2\left(\sum_{i=1}^{6} T3(i)\right),$$

$$T2\left(\sum_{i=1}^{6} T1(i) + 1\right) = T2(1).$$

An identifier of EOT (end of table), for instance the numeral 0, should be inserted in the end of the second table.

The broadcasting method mentioned above has been described so far on assumption that the base station does not know in which sector a mobile station in question is in. The method is applicable to the time of switching on and in the waiting state. But after a communication is started and the base station has learned the sector where the mobile station exists, the base station has to inform only the individual frequencies of the adjacent sectors of the same zone and the control channels of the adjacent zones. During the waiting state, the mobile station learns these frequencies from the broadcasting information in accordance with a certain procedure, but during a communication, the base station informs simply the frequencies as they are. A part of the communication channels may be used for the channels through which the base station informs the mobile station of those frequencies during a communication by means of frequency division multiplex or time division multiplex. As communication channels are assigned to respective mobile stations during a communication, they can transmit information exclusive to each station. Taking advantage of the feature, the broadcasting method is practically feasible.

Communication channels may be used for the sector individual frequencies by assigning a certain predetermined channel to each sector and using the channel as the individual frequency for identifying the sector. For the purpose, the communication channels do not need to have any special information in their content for sector identification but must constantly issue radio waves at their unique frequencies. If channels are preferentially assigned to communication, almost no demerit will be produced even if they have to constantly issue radio waves.

Alternately, carriers without modulation may be used as the sector individual frequencies. They need not to be modulated as they do not have to transmit any information but are used simply to identify the receiving levels for identification of sectors. As carriers without modulation have almost no frequency band, they hardly impose extra burden on the other components even if their frequencies are utilized.

The sector individual frequencies may be the control channels which transmit the control signals for respective sectors or the frequencies for user packets.

This invention has been described referring to the case where a system is divided into sectors, but this method is applicable to decide the zones in the system where plural base stations are used as a unit in the control channel structure and assigned with individual frequencies respectively. The assignment of individual frequencies may be made in plural stages. More specifically, plural number of units to each of which is assigned the individual frequency is grouped and then the group is assigned with another individual frequency. By assigning them in two hierarchical stages, the number of scans for identification of the position of a mobile station may be simplified as the individual frequencies of the larger groups are first scanned and then those of downstream groups are sequentially scanned.

INDUSTRIAL USE

As described in the foregoing statement, this invention achieves a high utilization efficiency of the frequencies as one control channel is assigned to one zone instead of one sector. It is advantageous as it needs not to measure the receiving levels at the base station and therefore can reduce the burden imposed on the base station.

The method according to this invention can improve paging signal reception reliability and sector decision precision and shorten the time required from the activation to preparation of ready condition for paging.

This invention method can reduce the number of frequencies which should be monitored, shorten the time for detecting movement, and improve the intermittent ratio as it uses the measurement and comparison of relative values of the control channels of the zone in which a mobile station stays and individual frequency of the sector it stays for detecting the movement within the zone.

This invention can reduce the number of frequencies which should be monitored as the method for the base station informs mobile stations of the sector individual frequencies and the control channels of the zone may be used to the irregular arrangement of zones and sectors to learn the control channels of the adjacent zones and individual frequencies of the adjacent sectors.

TABLE 1

| Zone | Control channel |
|---|---|
| Z0 | $f_0$ |
| Z1 | $f_0'$ |
| Z2 | $f_0''$ |

TABLE 2

| Sector | Control channel |
|---|---|
| A | $f_A$ |
| B | $f_B$ |

TABLE 2-continued

| Sector | Control channel |
|---|---|
| C | $f_C$ |
| D | $f_D$ |
| E | $f_E$ |
| F | $f_F$ |

TABLE 3

| Control channel | Sector individual frequency |
|---|---|
| $f_{10}$ | $f_{11}, f_{12}, f_{13}, f_{14}, f_{15}, f_{16}$ |
| $f_{20}$ | $f_{21}, f_{22}, f_{23}, f_{24}, f_{25}, f_{26}$ |
| $f_{30}$ | $f_{31}, f_{32}, f_{33}, f_{34}, f_{35}, f_{36}$ |
| $f_{40}$ | $f_{41}, f_{42}, f_{43}, f_{44}, f_{45}, f_{46}$ |
| $f_{50}$ | $f_{51}, f_{52}, f_{53}, f_{54}, f_{55}, f_{56}$ |
| $f_{60}$ | $f_{61}, f_{62}, f_{63}, f_{64}, f_{65}, f_{66}$ |
| $f_{70}$ | $f_{71}, f_{72}, f_{73}, f_{74}, f_{75}, f_{76}$ |

TABLE 4

| ID number | Frequency |
|---|---|
| 1 | $f_1$ |
| 2 | $f_2$ |
| . | . |
| . | . |
| 255 | $f_{255}$ |
| 256 | $f_{256}$ |

TABLE 5

| Order | ID number | Order | ID number |
|---|---|---|---|
| 1 | 37 | 10 | 18 |
| 2 | 38 | 11 | 17 |
| 3 | 39 | 12 | 19 |
| 4 | 40 | 13 | 24 |
| 5 | 41 | 14 | 26 |
| 6 | 42 | 15 | 25 |
| 7 | 3 | 16 | 33 |
| 8 | 11 | 17 | 32 |
| 9 | 10 | 18 | 4 |

TABLE 6(a) TABLE 1

| Order | ID number | | Sector |
|---|---|---|---|
| 1 | 43 | ... | A |
| 2 | 44 | ... | B |
| 3 | 45 | ... | C |
| 4 | 46 | ... | D |
| 5 | 47 | ... | E |
| 6 | 48 | ... | F |

TABLE 6(b) TABLE 2

| | Order | ID number |
|---|---|---|
| Sector individual frequency in other zone | 1 | 3 |
| | 2 | 4 |
| | 3 | 12 |
| | 4 | 11 |
| | 5 | 10 |
| | 6 | 13 |
| | 7 | 18 |
| | 8 | 19 |
| | 9 | 26 |
| | 10 | 25 |
| | 11 | 30 |
| | 12 | 32 |
| | 13 | 31 |
| | 14 | 38 |
| | 15 | 39 |
| Zone control channel | 16 | 202 |
| | 17 | 205 |
| | 18 | 208 |
| | 19 | 207 |
| | 20 | 206 |
| | 21 | 203 |
| | 22 | 201 |
| | 23 | EOT |

| Sector | Zone |
|---|---|
| A | I |
| B | II |
| | III |
| | IV |
| C | V |
| D | |
| | VI |
| E | |
| | VII |
| F | |
| | I |

TABLE 6(c) TABLE 3

| Order | ID number | | Sector |
|---|---|---|---|
| 1 | 3 | ... | A |
| 2 | 4 | ... | B |
| 3 | 1 | ... | C |
| 4 | 3 | ... | D |
| 5 | 2 | ... | E |
| 6 | 2 | ... | F |

TABLE 6(d) TABLE 4

| Order | ID number | | Sector |
|---|---|---|---|
| 1 | 1 | ... | Z1 |
| 2 | 2 | ... | Z2 |
| 3 | 3 | ... | Z3 |
| 4 | 2 | ... | Z4 |
| 5 | 1 | ... | Z5 |
| 6 | 3 | ... | Z6 |
| 7 | 2 | ... | Z7 |
| 8 | 1 | ... | Z1 |

What is claimed is:

1. A location system for a mobile communication system having a plurality of zones and a plurality of sectors in each zone, the location system locating a particular zone and sector in which a mobile station is located, the location system comprising:
 a base station means associated with each zone for transmitting a control channel signal for its associated zone, each zone's control channel signal being different from those of other zones, and for transmitting a sector signal for each sector in the zone, each sector signal being different from other sector signals and control channel signals; and
 mobile station means associated with each mobile station for receiving control channel signals, determining which zone the mobile station is in a location zone based on the received control channel signals, receiving sector signals for sectors within the location zone, and determining which sector of the location zone the mobile station is in a location sector based on the received sector signals.

2. The location system of claim 1, wherein the base station means comprises base transmitter/receiver means for transmitting the control channel signal and a sector signals via directional antennas, each directional antenna being associated with a sector, the base transmitter/receiver means transmitting the control channel signal via the directional antennas and transmitting each sector signal via a corresponding directional antenna.

3. The location system of claim 1, wherein the mobile station means comprises:
   mobile transmitter/receiver means for receiving signals including the control channel signals and sector signals;
   filter means for selecting a received signal;
   measuring means for measuring the receiving level of the selected received signal;
   control means for controlling the filter means to select the received control channel signals, determining as the location zone a zone associated with a control channel signal having the highest receiving level, controlling the filter means to select the sector signals associated with the sectors in the location zone, and determining as the location sector a sector associated with a sector signal having the highest receiving level.

4. The location system of claim 3, wherein the mobile station means comprises:
   a frequency memory means for storing frequencies of the control channel signals and frequencies of the sector signals associated with each control channel signal; wherein
   the filter means selects a received signal based on a desired frequency output by the control means; and
   the control means inputs the frequencies of the control channel signals from the frequency memory means, outputs the frequencies of the control channel signals to the filter means as desired frequencies, inputs the frequencies of the sector signals associated with the sectors in the location zone from the frequency memory means, and outputs the frequencies of the sector signals associated with the sectors in the location zone to the filter means as desired frequencies.

5. The location system of claim 3, wherein
   the base station means transmits identification signals indicating frequencies of the control channel signals and indicating frequencies of the sector signals associated with the sectors of each zone; and
   the filter means selects a received signal based on a desired frequency output by the control means; and
   the control means controls the filter means to select the identification signals, determines the frequencies of the control channels signals from the identification signals, outputs the frequencies of the control channel signals to the filter means as desired frequencies, determines the frequencies of the sector signals associated with sectors in the location zone based on the identification signals, and outputs the frequencies of the sector signals associated with the sectors in the location zone to the filter means as desired frequencies.

6. The location system of claim 5, wherein
   the mobile station means further comprises frequency memory means for storing the frequencies of the control channel signals and the frequencies of the sector signals, the stored frequencies being addressable based on a corresponding identification address; wherein
   the base station means transmits the identification signals each indicating a different identification address; and
   the control means inputs the frequencies of the control channels and the sector signals associated with the sectors in the location zone from the frequency memory means using the identification addresses.

7. The location system of claim 1, wherein the mobile station means further performs the function of detecting movement of the mobile station from one sector to another within a zone.

8. The location system of claim 7, wherein the mobile station means further comprises:
   mobile transmitter/receiver means for receiving signals including the control channel signals and the sector signals;
   filter means for selecting a received signal;
   measuring means for measuring the receiving level of the selected received signal;
   control means for controlling the filter means to select the control channel signal associated with the location zone and the sector signal associated with the location sector, determining a ratio of a receiving level of the sector signal associated with the location sector to a receiving level of the control channel signal associated with the location zone, comparing the ratio to a predetermined value, and determining that the mobile station has moved to a new sector based on the comparison.

9. The location system of claim 1, wherein the mobile station means further performs the function of detecting movement of the mobile station from one zone to another.

10. The location system of claim 9, wherein the mobile station means comprises:
    mobile transmitter/receiver means for receiving signals including the control channel signals and the sector signals;
    filter means for selecting a received signal;
    measuring means for measuring the receiving level of the selected received signal;
    control means for controlling the filter means to select the control channel signal associated with the location zone and control channel signals associated with zones adjacent to the location zone, determining a ratio of a receiving level of a control channel signal associated with an adjacent zone to a receiving level of the control channel signal associated with the location zone, comparing the ratio to a predetermined value, and determining that the mobile station has moved to the adjacent zone based on the comparison.

11. The location system of claim 10, wherein the mobile station mean comprises memory means for storing which zones are adjacent to each zone and control channel signals thereof, and the control means inputs from the memory means control channel signals of zones adjacent to the location zone.

12. The location system of claim 10, wherein the base station means transmits identification signals indicating that zones are adjacent to each zone and control channel signals thereof, and the control means determines control channel signals of zones adjacent to the location zone based on the identification signals.

13. A location method for a mobile communication system having a plurality of zones and a plurality of sectors within each zone, the location method locating which zone and sector within the zone a mobile station is in, each zone associated with a base station, each base station transmitting signals including a control channel signal and sector signals, each control channel signal differing from control channel signals of other zones, and each sector signal being associated with a sector in a zone and differing rom other sector signals and control channel signals, the method comprising the steps of:

receiving signals on a mobile station's transmitter/receiver including control channel signals and sector signals;

first measuring a receiving level of each control channel signal using a receiving level detector of the mobile station;

first determining which zone the mobile station is in as a location zone based on the receiving levels of the control channel signals using a controller of the mobile station;

second measuring a receiving level of each sector signal associated with the sectors in the location zone using the receiving level detector; and second determining which sector of the location zone the mobile station is in as a location sector based on the receiving levels of the sector signals associated with the sectors in the location zone using the controller of the mobile station.

14. The location method of claim 13, wherein the first measuring step includes the steps of:

first filtering the received signals to obtain each control channel signal using a filter means of the mobile station, and first detecting the receiving level of each obtained control channel signal using the receiving level detector of the mobile station; and the second measuring step includes the steps of:

second filtering the received signals to obtain each sector signal of sectors in the location zone using a filter means of the mobile station, and second detecting the receiving level of each obtained sector signal associated with the sectors in the location zone using receiving level detector of the mobile station.

15. The location method of claim 13, wherein the first determining step includes the steps of determining which control channel signal has the highest receiving level, and designating the zone associated with the control channel signal having the highest receiving level as the location zone; and the second determining step includes the steps of determining which sector signal of the sectors in the location zone has the highest receiving level, and designating the sector associated with the sector signal having the highest receiving level as the location sector.

16. The location method of claim 13, further comprising the steps of:

third determining a ratio of the receiving level of the sector signal associated with the location sector to the receiving level of the control channel signal associated with the location zone; .

comparing the ratio to a predetermined value; and fourth determining that the mobile station has moved to a new sector based on results of the comparison step.

17. The location method of claim 13, further comprising the steps of:

determining a ratio of the receiving level of a control channel signal associated with an adjacent zone to the receiving level of the control channel signal associated with the location zone;

comparing the ratio to a predetermined value;

determining that the mobile station has moved to a new zone based on the results of the comparison step.

18. A location method for a mobile communication system having a plurality of zones and a plurality of sectors in each zone, the location method locating which zone and sector within a zone a mobile station is in, the method comprising the steps of:

transmitting a control channel signal and sector signals for each zone from a corresponding base station, each control channel signal of a zone differing from control channel signals of other zones, and each sector signal being associated with a sector in a zone and differing from other sector signals and control channel signals;

receiving signals on a mobile station's transmitter/receiver including control channel signals and sector signals;

first measuring a receiving level of each control channel signal using a receiving level detector of the mobile station;

first determining which zone the mobile station is in as a location zone based on the receiving levels of the control channel signals using a controller of the mobile station;

second measuring a receiving level of each sector signal associated with the sectors in the location zone using the receiving level detector; and second determining which sector of the location zone the mobile station is in as a location sector based on the receiving levels of the sector signals associated with the sectors in the location zone using the controller of the mobile station.

* * * * *